UNITED STATES PATENT OFFICE.

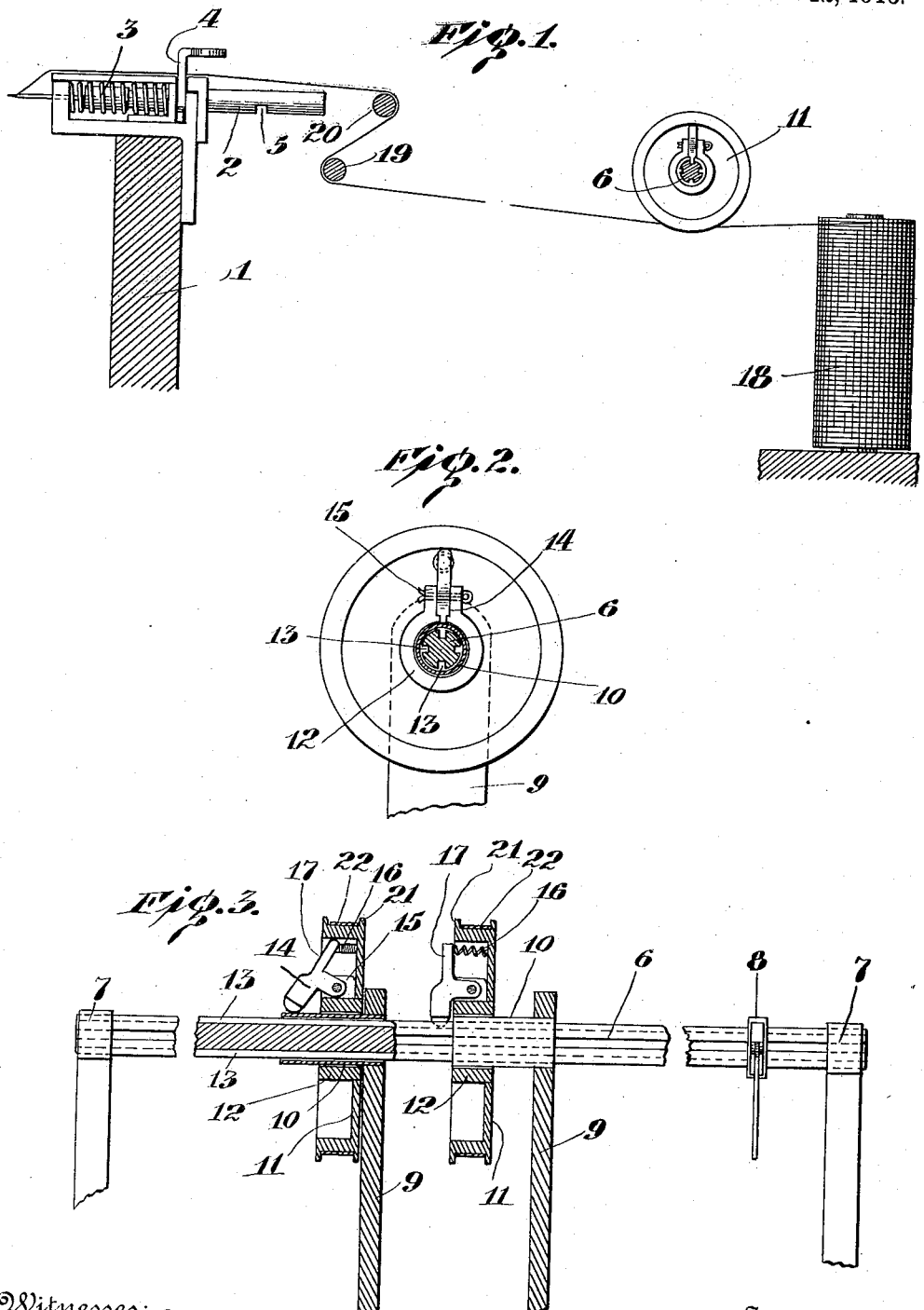

WILLIAM ALBERT WHITE AND EUGENE W. KELLER, OF NORTH BERGEN, NEW JERSEY.

TENSION DEVICE FOR EMBROIDERING-MACHINES.

1,124,827.       Specification of Letters Patent.       Patented Jan. 12, 1915.

Application filed June 20, 1914. Serial No. 846,226.

*To all whom it may concern:*

Be it known that we, WILLIAM A. WHITE and EUGENE W. KELLER, citizens of the United States, and both residents of North Bergen, in the county of Hudson and State of New Jersey, have invented certain new and useful Improvements in Tension Devices for Embroidering-Machines, of which the following is a specification.
This invention relates to embroidering machines, and our improvements have particular reference to the means whereby the tension on those threads whose needles are rendered inoperative to change the "repeat" of the embroidery design, or for other purposes in the operation of the machine, may be relaxed to prevent feeding of thread to said inoperative needles.

Our improvements further relate to means for re-applying the thread tension which has been relaxed.

With these and other objects in view our invention consists of a number of individual thread tension devices between the thread spools and the needles they supply, said devices having a common support, with which they operate in unison, accompanied by means whereby any one or more of said tension devices may be disconnected from said support to halt feeding of thread to the particular needle or needles they supply, and which may have been thrown out of operative arrangement, or disabled; also with means for instantly reconnecting said tension device or devices with said support to resume the thread feeding operation.

In carrying out this invention we provide a shaft upon which are mounted a number of friction devices, such as disks or wheels, the periphery of each one having wrapped therearound a single thread, each disk or wheel serving as a separate tension device between a spool and the needle it supplies, because all of said disks or wheels are normally clutched to the shaft, and said shaft, although rotatable in its bearings, being suitably retarded or braked in its rotation to keep the thread taut and prevent overthrow from the spools.
The shaft has one or more longitudinal grooves, and each individual friction device, on the shaft, has a separate clutch in the form of a spring pressed pivotal dog or pawl, which normally engages in a groove to thereby connect said device to said shaft, whereby the intermittent thread feed in the reciprocating action of the needle bar, exercising draft upon all said friction devices together, thereby rotates the shaft and draws the requisite quotas of thread from the spools. Each friction device is mounted upon a separate sleeve, the shaft extending loosely through said sleeves and the sleeves being supported in fixed relation to the shaft.

Each friction device is capable of both axial and rotating movement upon its sleeve, and the clutch upon a friction device can only engage the groove in the shaft when said friction device is shifted toward one end of said sleeve and rotated to bring said clutch into radial opposition thereto. Upon axial retraction of said friction device the clutch rides up upon the surface of the sleeve thereby disconnecting the friction device from the shaft to render said device idle. The shaft may have a number of longitudinal grooves to reduce the extent of rotation of the friction device necessary to permit engagement of the clutch.

Other features and advantages will appear hereinafter.

In the drawing accompanying this application; Figure 1 is a diagrammatic view representing in vertical section a needle carrying bar with needle holder and needle, together with a spool and a friction wheel or disk between said bar and spool. Fig. 2 is a section through the shaft carrying the friction disks or wheels, and Fig. 3 is a front section view of two of the friction disks or wheels mounted on the shaft.

Since our present improvements are directed mainly to the tension devices for the thread feed we have illustrated herein only those associated parts which co-act therewith and have not deemed it necessary to show other parts of an embroidering machine, the general construction thereof being unchanged by us and known to those skilled in the art.

We have however shown a needle bar, as 1, which as usual is movable to and from the work, and which carries a number of needle holders, as 2, (one only being shown in Fig. 1) the general character of said holders corresponding with that related in our copending application Serial No. 788180, filed September 4th, 1913, the holder having a retracting spring 3, a spring held catch 4, and a notch 5 in the holder to engage with said catch when the needle is projected for operation.

A shaft 6 is supported as in bearings 7 at right angles to and in front of the needle holders, the rotation of said shaft being retarded as by brake 8.

Spaced along said shaft 6, in fixed relation thereto, and having supports 9, are a series of short sleeves 10, and mounted on each of said sleeves is a disk or wheel 11, whose hub 12 is shorter than said sleeve, said disk or wheel, by means of its hub, being capable of both axial and rotary movement upon said sleeve, its axial movement in one direction being limited by the sleeve support 9.

The shaft 6 is provided with a number of longitudinal grooves 13, four of such grooves, equi-spaced apart, being here shown, and a dog or pawl 14, pivoted in ears 15 extending from the hub 12, is adapted when the disk or wheel 11 is shifted along the sleeve 10 to its free edge to be pressed into one of said grooves by a spring 16, that lies between the tail 17 of said dog or pawl and the disk or wheel.

The disk or wheel 11 shown at the right of Fig. 3 represents the dog or pawl in engagement with a groove in the shaft, thereby effecting clutch engagement between the disk or wheel and the shaft.

The other disk or wheel shown in Fig. 3 is represented as shifted away from the free edge of the sleeve, whereby the dog or pawl has been cammed over the sleeve, being thus disengaged from the groove in the shaft and lying idle on the surface of said sleeve, whereby the disk or wheel is disconnected from the shaft and incapable of drawing thread from its spool, as 18, in the continued rotation of shaft 6.

In thus rendering a disk or wheel inoperative the attendant may at the time when a needle holder is retracted, grasp the disk or wheel from which thread passes to said holder, and shift it to the inoperative position, either pressing upon the tail 17 of the dog or pawl, or not, as the latter will leave the groove easily under the pressure exerted upon it by the sleeve edge in the shifting action. In returning the disk or wheel to operative position it is only necessary to shift it back until the dog or pawl leaves the sleeve and is urged by its spring into contact with the shaft, because if the dog or pawl does not at once strike into a groove 13, the rotation of the shaft will quickly bring it over the next groove in advance which it will enter automatically under the spring pressure, thus effecting the clutch engagement again between disk or wheel and shaft.

The thread from each spool passes around an intermediate disk or wheel 11, thence over the usual take up rods 19, 20, and to a needle upon the needle bar 1. The disks or wheels 11 may each be provided with thread retaining flanges 21, and their peripheries may have emery or other frictional surfacing, as at 22, according to the requirements of the work and the character of the thread material employed.

Variations may be made within the scope of the invention and parts thereof used without others.

Having described our invention we declare that what we claim is:

1. A thread tension device for embroidering machines, a shaft over which said device is axially movable, and means operative in the axial movement of said device in opposite directions for engaging and disengaging said device and shaft.

2. A thread tension device for embroidering machines comprising a revoluble shaft having a groove, a disk or wheel axially movable on said shaft, a dog or pawl on said disk or wheel adapted to enter said groove to clutch said disk or wheel and shaft together, and means for releasing said dog or pawl from said groove in an axial movement of said disk or wheel to release the clutch engagement.

3. A thread tension device for embroidering machines comprising a revoluble shaft having a groove, a sleeve supported in fixed relation to and surrounding said shaft, a disk or wheel movable both revolubly and axially upon said sleeve, a spring pressed pivotal dog or pawl mounted upon said disk or wheel, said dog or pawl lying upon said sleeve to hold the disk or wheel free from said shaft when shifted in one direction on said sleeve and said dog or pawl being capable of entering said groove to clutch said disk or wheel and shaft together when said disk or wheel is shifted in the other direction.

4. A thread tension device for embroidering machines comprising a revoluble shaft having a number of parallel, longitudinal grooves, a sleeve supported in fixed relation to and surrounding said shaft, a disk or wheel movable both revolubly and axially upon said sleeve, a spring pressed dog or pawl mounted upon said disk or wheel, said dog or pawl lying upon said sleeve to hold the disk or wheel free from said shaft when shifted in one direction on said sleeve, and said dog or pawl being capable of entering one of said grooves to clutch said disk or wheel and shaft together, when said disk or wheel is shifted in the other direction.

5. A thread tension device for embroidering machines comprising a revoluble shaft having a longitudinal groove, a number of sleeves, spaced apart and supported in fixed relation to and surrounding said shaft, a disk or wheel movable both revolubly and axially upon each sleeve, a spring pressed dog or pawl mounted upon each disk or wheel, each dog or pawl lying upon the sleeve for its disk or wheel to hold the latter free from said shaft when shifted in one direction thereon, and each dog or pawl being capable of entering said groove to clutch the disk or wheel carrying it to said shaft when said disk or wheel is shifted in the other direction.

6. A thread tension device for embroidering machines comprising a revoluble shaft having a longitudinal groove, a number of sleeves, spaced apart and supported in fixed relation to and surrounding said shaft, a disk or wheel movable both revolubly and axially upon each sleeve, a spring pressed dog or pawl mounted upon each disk or wheel and engaging with said groove when the disk or wheel carrying it is shifted in one direction to clutch said disk or wheel and shaft together, and each dog or pawl being cammed on to the sleeve upon which its disk or wheel is mounted when said disk or wheel is shifted in the opposite direction to release said clutch engagement.

Signed at the borough of Manhattan in the city, county and State of New York this 15th day of June, A. D. 1914.

WILLIAM ALBERT WHITE.
EUGENE W. KELLER.

Witnesses:
F. W. BARKER,
HARRY J. NEUSCHAFER.

Copies of this patent may be obtained for five cents each, by addressing the "Commissioner of Patents, Washington, D. C."